United States Patent
Dräger et al.

(10) Patent No.: US 7,225,106 B2
(45) Date of Patent: May 29, 2007

(54) DATA PROCESSING SYSTEM AND METHOD FOR PROCESSING TEST ORDERS

(75) Inventors: Matthias Dräger, Leverkusen (DE); Rainer Schmitz, Wermelskirchen (DE); Gerhard Maldener, Leichlingen (DE); Dirk Spingat, Velbert (DE)

(73) Assignee: Bayer Business Services GmbH, Leverkusen (DE)

( * ) Notice: Subject to any disclaimer, the term of this patent is extended or adjusted under 35 U.S.C. 154(b) by 0 days.

(21) Appl. No.: 10/960,633

(22) Filed: Oct. 7, 2004

(65) Prior Publication Data

US 2005/0096869 A1 May 5, 2005

(30) Foreign Application Priority Data

Oct. 14, 2003 (EP) ................... 03023074

(51) Int. Cl.
*G06F 11/30* (2006.01)
*G21C 17/00* (2006.01)

(52) U.S. Cl. .................................... 702/182

(58) Field of Classification Search ............... 702/117, 702/118, 122, 182, 188, 189; 705/1, 8, 26
See application file for complete search history.

(56) References Cited

U.S. PATENT DOCUMENTS 6,581,020 B1* 6/2003 Buote et al. ................ 702/123
6,684,120 B1* 1/2004 Oku et al. ................... 700/108
2004/0111274 A1* 6/2004 O'Rourke et al. ............. 705/1

FOREIGN PATENT DOCUMENTS

| EP | 1006 468 A | 6/2000 |
|---|---|---|
| JP | 10090250 | 4/1998 |

OTHER PUBLICATIONS

XP010008586 Chang L C: "Computer-integrated quality information system" Interntional Engineering Management Conference, Oct. 21, 1990 pp. 85-88.
XP008031441 Rolston, S. "Meet Demand with Optoelectronic Software" Advanced Packaging, 'Online! vol. 2, No. 9, Sep. 2003 pp. 63-64, US ISSN 1065-055.
Copyright 2005 ASTM International. Active Standard: E1578-93(1999) Standard Guide for Laboratory Information Management Systems (LIMS) http://astm.org/cgi-bin/SoftCart.exe/index.shtml?E+mystore.

* cited by examiner

*Primary Examiner*—Michael Nghiem
(74) *Attorney, Agent, or Firm*—Christa Hildebrand; Norris McLaughlin & Marcus, PA

(57) ABSTRACT

The present invention relates to a data processing system and method for seamlessly integrating laboratory information management system (LIMS) functionalities into an enterprise resource planning (ERP) system. The invention enables to keep the additional complexity that is required for the provision of LIMS functionalities at a minimum as all laboratory instrumentation setup information is centrally stored in a server computer but not in the ERP system.

11 Claims, 3 Drawing Sheets

DATA PROCESSING SYSTEM AND METHOD FOR PROCESSING TEST ORDERS

BACKGROUND OF THE INVENTION

1. Field of the Invention

Figure 1:
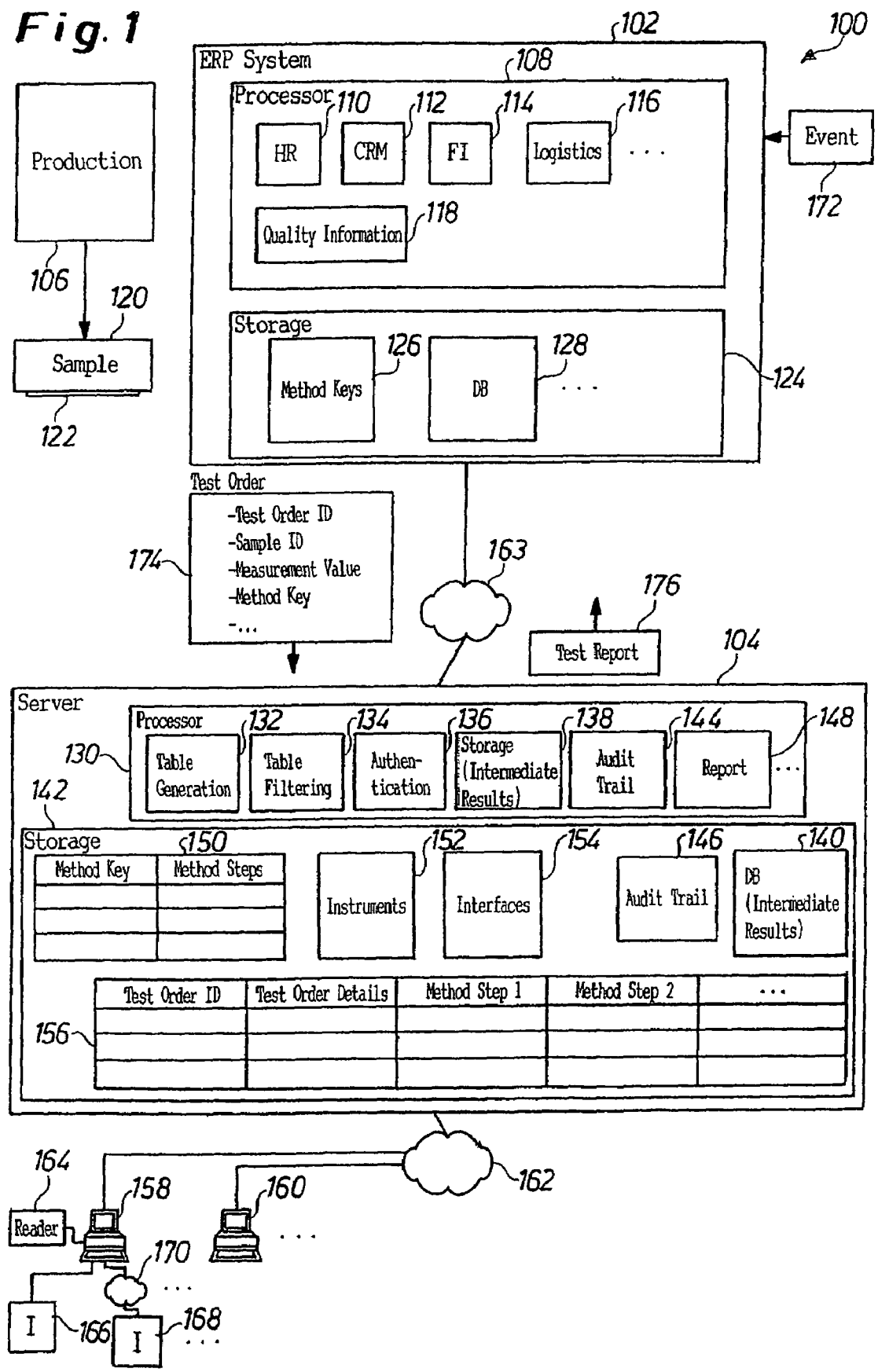

The present invention relates to a data processing system and a method, and more particularly to the processing of test orders for the testing of production samples.

2. Description of the Related Art

Enterprise resource planning (ERP) systems are used for various purposes including the administration of human resources, customer relationship management, inventory management and valuation, purchasing, sales, shipping, credit limit check, foreign trade controls and various other administrative, planning, report, logistics and control functions that are required for running a business. ERP systems are commercially available from SAP AG, Germany and others.

Laboratory information management systems (LIMS) are used for the purpose of laboratory automation and communication. American Society for Testing and Materials (ASTM) Document E1578 provides an overview of prior art LIMS concepts.

A common disadvantage of prior art LIMS is that they are more or less insular solutions, which cannot be integrated into a company's ERP. This creates various inefficiencies during the development and production of many products, such as pharmaceutical and chemical products for which the performance of various tests and evaluations and the recordation of test results is required by law. For example, under US law the requirements for the collection of test data are defined in federal regulations 21 C.F.R. Sec. 11.

To comply with such regulatory requirements manufactures devised standard operating procedures (SOP's) that are often prepared by a manufactures internal quality assurance department (QA) or by a contracted independent auditor.

A lot of laboratory staff time is spent on documentation related to these tests in addition to the actual laboratory operations. Cycle times from sample arrival to certificate of analysis are often quoted at 10 to 15 days.

U.S. Pat. No. 6,581,020 describes a system for managing and reporting laboratory data wherein the data is obtained at remote data-taking stations and transferred instantaneously by wireless communication to a main data-storing/manipulation station for recording therein without being recorded at the remote data-taking stations. Again, this system is not integrated with an ERP.

There is therefore a need to provide an improved data processing system in order to increase the efficiency of the generation and collection of test data and to reduce cycle times.

SUMMARY OF THE INVENTION

The present invention provides a data processing system that comprises at least one ERP system that is coupled to a server computer. The ERP system stores a set of test method keys. The ERP system can generate test orders for testing of production samples. A test order for testing a production sample carries one or more method keys that are selected from the set of available method keys.

The server computer has means for storing method definitions to be performed for carrying out test methods, each sequence being retrievable using a respective method key and means for retrieving one of the method definitions using the method key of a received test order and for instantiating a retrieved method definition to provide method steps. There can be different kinds of method steps such as automatic measurements to be performed by laboratory instruments and/or actions to be performed by laboratory staff, e.g. handling of semi-automatic laboratory instruments and/or manual data input operations, and calculations or evaluations to be performed on intermediate results. Such intermediate results can impact the performance of the method. For example, the execution of a method step can depend on the intermediate result or results obtained from the execution of one or more previous method steps.

Further, the server computer has means for generating a tabular representation of the received test orders showing the method steps, database means for storing intermediate results received from a client computer obtained by performance of one or more of the method steps, and processing means for performing calculations in accordance with one or more of the method steps using the intermediate results. In addition, the sever computer has means for generating a test report (176) for the ERP system. For example, the test report is a data which describes the results in machine readable form. Preferably the test report is transmitted as an electronic message from the server computer to the ERP system.

The server computer is coupled to at least one client computer having user interface means for viewing the tabular representation and for selecting one of the test orders and laboratory instrumentation interface means for communicating with a laboratory instrument, the laboratory instrument being adapted to perform at least one of the method steps on the production sample.

For example, the server computer stores a number of method steps and further data like information regarding appropriate laboratory instruments and/or result calculation rules ("method definition") for each available testing method. Some of the method steps may require sequential execution while other method steps can be executed in parallel. Each testing method definition is identified by one of the method keys. A method key can be used to retrieve the respective method steps from a storage means of the server computer. Depending on the content of the test order the method steps are instantiated. The server computer has retrieval means for the method steps belonging to a method key contained in a received test order.

The server computer generates a tabular representation of received test orders. The tabular representation also includes of the instantiated method steps. Further, the server computer has a database for storing of intermediate results obtained by the performance of method steps. A final report is generated on the basis of the intermediate results and is sent back to the ERP system as a response to the test order in a way that allows using the results in the ERP system in further processing steps.

One or more client computers are coupled to the server computer. A client computer has a user interface that allows a user to view the tabular representation of the test orders including the sequences of method steps. Further, the client computer has a laboratory instrumentation interface for communication with laboratory instruments that are coupled to the client computer. An appropriate laboratory instrument is selected automatically in order to perform a given method step on a production sample based on the method definitions.

The data processing system of the invention is particularly advantageous as it allows to seamlessly integrate LIMS functionalities into an ERP system by only adding a very limited amount of complexity to the ERP system. This is accomplished by storing only the method keys on the ERP system but not the complete sequences of method steps. The sequences of method steps and further data like information regarding appropriate laboratory instruments and/or result calculation rules are stored centrally on the server computer which greatly simplifies the maintenance and updating of the method steps. This makes it possible to use the server as a central hub that can be used by a number of ERP systems to provide LIMS functionality.

In accordance with a preferred embodiment of the invention the ERP system has a logistics component for supporting the distribution of production samples to client computer locations. For example, production samples are labelled with a bar code that carries a sample identifier. A production sample is transported to a client computer location where a user reads the bar code by means of a bar code reader for automatic identification of the sample.

In accordance with a preferred embodiment of the invention all Meta data relating to the laboratory instruments coupled to the client computers is centrally maintained on the server computer. For example, the server computer stores database tables that specify communication interfaces supported by the various laboratory instruments.

In accordance with a further preferred embodiment of the invention the server computer has a filter component for filtering the tabular representation of the test orders. For example, if a given user belongs to a certain organizational entity of the enterprise, the filtering is performed in order to filter out such test orders for which the user's organizational entity is responsible. Another filter option is to filter out such test orders that can be handled by the user's client computer in view of the laboratory instrumentation that is coupled to this client computer. In other words, filtering can be performed on an organizational level and/or an instrumentation level such that only test orders are shown to a user for which the user is responsible and/or which can be handled by the user in view of the available laboratory instrumentation coupled to his or hers client computer.

In accordance with a further preferred embodiment of the invention the server computer has an authentication component. User authentication can be performed by means of any suitable authentication method. Examples include authentication by means of integrated circuit (IC) cards, smart cards or the like or by means of biometric feature recognition.

In accordance with a further preferred embodiment of the invention the server computer generates an audit trail for generating a history of testing transactions. Each entry of the audit trail describes the respective transaction and identifies the user that has initiated and/or performed the respective data entry including a time stamp and the reason for the action.

In accordance with a further preferred embodiment of the invention an approval of the test results is required by another user that was not involved in performing the test. For example, the user that has initiated or supervised the performance of the test digitally signs the test results. Before a final test report can be generated a second digital signature of another user that was not involved in the performance of the test is required. Preferably, the audit trail is utilized in order to check if the approval of the other user can be accepted or not.

BRIEF DESCRIPTION OF THE SEVERAL VIEWS OF THE DRAWING(S)

Figure 2:
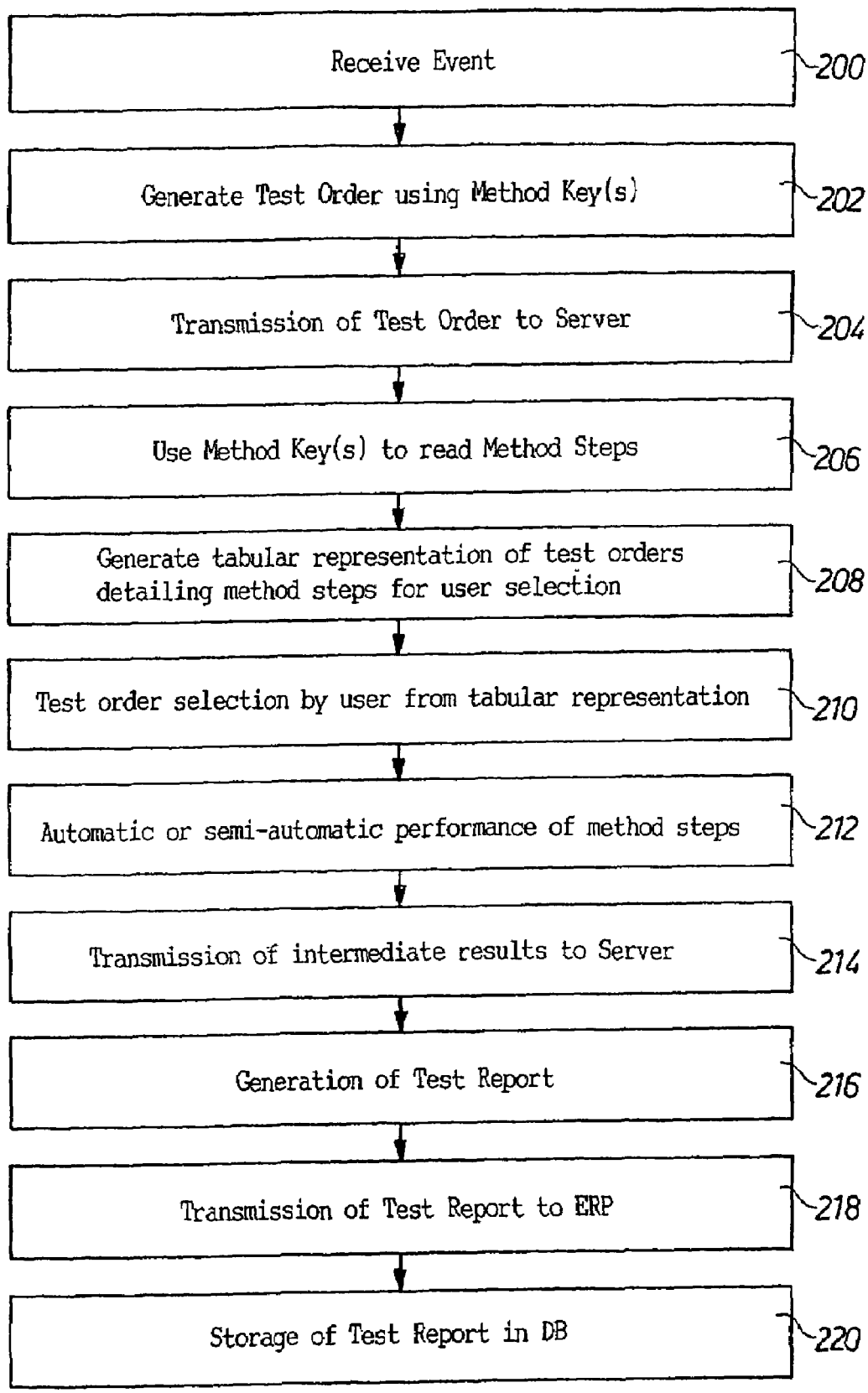
Figure 3:
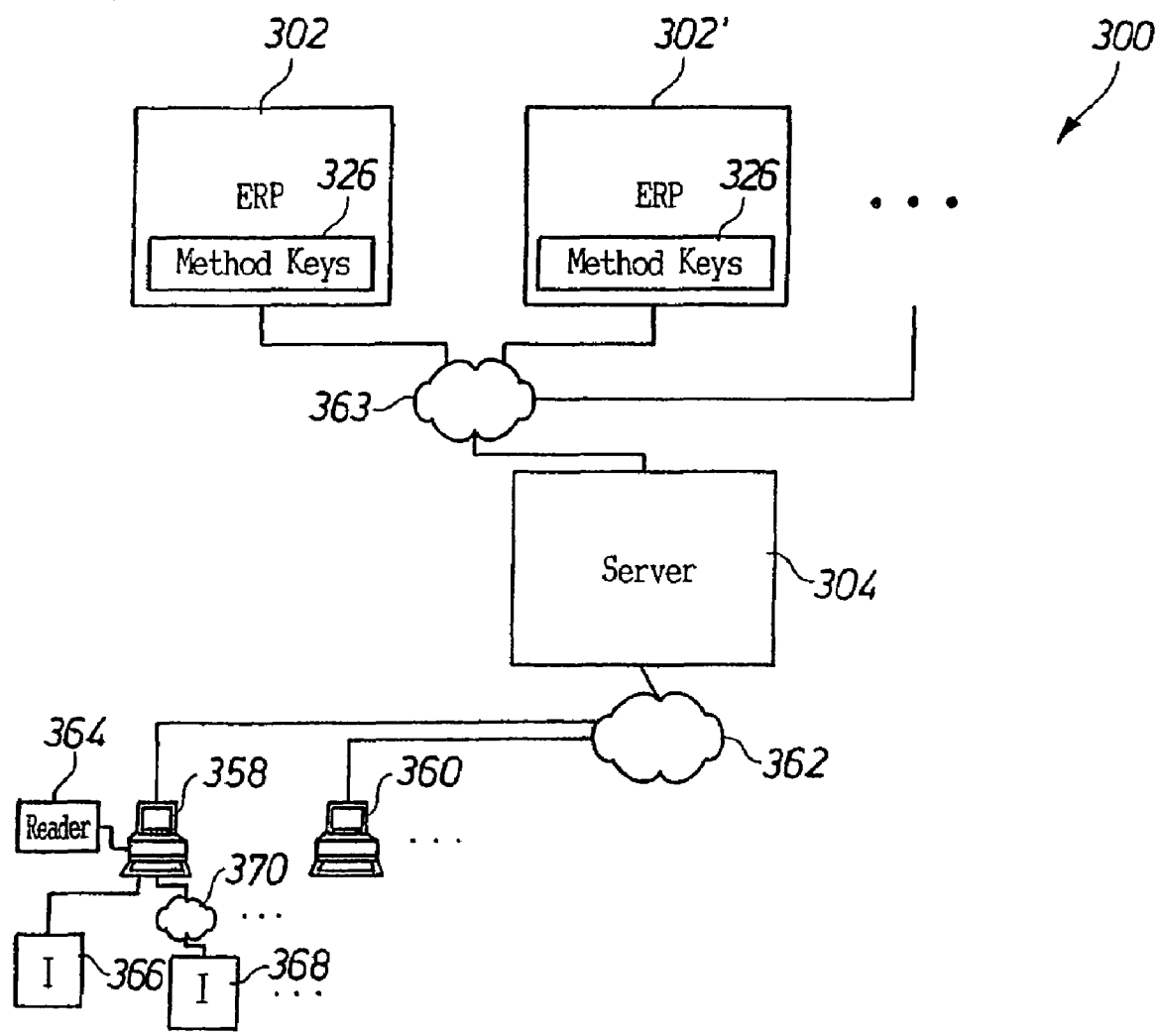

In the following preferred embodiments of the invention will be described in greater detail by way of example only making reference to the drawings in which:

FIG. 1 is a block diagram of a preferred embodiment of a data processing system of the invention, FIG. 2 is a flow diagram illustrating a preferred embodiment of a method of the invention, FIG. 3 is a block diagram of an alternative embodiment of the data processing system of the invention, where the server computer acts as a central hub for multiple ERP systems.

DETAILED DESCRIPTION OF THE INVENTION

FIG. 1 shows a data processing system 100 that comprises an ERP system 102, which is coupled to a server computer 104. The ERP system 102 serves for administration of a manufacturing plant 106, such as for the manufacturing of chemical or pharmaceutical substances. The ERP system has at least one microprocessor 108 for execution of various program components that provide ERP functionalities. These program components may include a human resources (HR) module 110, customer relationship management (CRM) module 112, financials (FI) module 114, and logistics module 116. Various additional ERP functionalities can be provided by other program modules that are not shown in FIG. 1 for ease of explanation.

In addition, processor 108 executes a program module 118 that serves for initiating the collection of test data, receiving test reports and archiving the test reports in accordance with the respective official regulations and/or the internal rules of control of the company that runs the manufacturing plant 106. Such regulations or internal rules of control typically require that samples are taken from the running production or during goods receipt from external procurement or a number of other logistic processes in order to perform a specified number of tests on the samples. FIG. 1 shows one such sample 120 by way of example. The sample 120 has an attached label 122 that carries a bar code.

The bar code contains a sample identifier (ID) that unequivocally identifies the sample 120.

The ERP system 102 has storage 124 for storing a set 126 of method keys. Each method key is assigned to a specific test method that has one or more method steps. The test methods and respective method steps are not specified in the ERP system 102.

Further, the storage 124 contains a database 128 that serves for storage of test results in compliance with the respective regulatory requirements.

The server computer 104 has at least one processor 130 for the execution of various program components. For example, the processor 130 runs a table generation module 132 that serves for generating a tabular representation of test orders received from the ERP system 102. Table filtering module 134 serves for implementation of various filter functions for filtering the tabular representation. For example, filtering is performed in order to filter out test orders assigned to a certain organizational entity or to filter out such test orders that can be executed by a given client computer.

Authentication module 136 serves for user authentication and can implement any suitable authentication method, such as password or IC-card implemented authentication methods or the identification of biometric features.

Storage module 138 serves for storage of intermediate results that are reported back from the client computers that are coupled to the server computer 104. The intermediate results are stored in a database 140, which is stored in storage 142 of the server computer 104.

Audit trail module 144 serves to generate an audit trail 146 that is stored in storage 142. Each entry of the audit trail 146 identifies a transaction and the user that has initiated, performed or entered the respective transaction and/or intermediate result data including a time stamp and the reason for the action.

Report module 148 serves to generate a test report using the intermediate results stored in the database 140.

A set of database tables 150 that is stored in storage 142 contains a list of the method keys and the respective method steps and further data like information regarding appropriate laboratory instruments and/or result calculation rules ("method definition"). In other words, each method key has an assigned method definition. For example, a method definition is stored as a list of one or more method steps. The method steps, including evaluation and calculation rules, can be specified by respective code words or machine executable instructions. The tables can also include a flow control, such as "if" or "if then else" logic flow control method steps.

An additional set of database tables 152 contains data descriptive of the available laboratory instruments and a set of database tables 154 that describes the available communication interfaces for communication with the laboratory instruments. The database tables 152 and 154 implement a relational database that describes the laboratory setup.

Table 156 is an example for a tabular output that is generated by table generation module 132. Table 156 contains a list of test orders received from the ERP system and the method steps that need to be executed for performance of each test order.

A number of client computers 158, 160, ... is coupled to the server computer 104, e.g. by means of a local area network (LAN) 162. For example, the server-client communication is performed using the TCP/IP protocol. The same or another network 163, such as the Internet or an intranet, can be used for coupling ERP system 102 and server computer 104.

The client computer 158 has a bar code reader 164 for reading the bar code on label 122 when the sample 120 has been transported to the client computer location of client computer 158. A number of laboratory instruments (I) 166, 168, ... are coupled to the client computer 158 using various interconnection technologies. For example, laboratory instrument 166 is directly coupled to client computer 158 by means of a serial cable. Laboratory instrument 168 is coupled to client computer 158 by means of a laboratory instrumentation bus or a field bus 170.

In operation the ERP system 102 receives an event 172. The event 172 is data that describes e.g. a logistics event, a customer request or an event reported from the manufacturing plant 106 that requires the testing of a sample in accordance with the applicable regulations and/or internal rules of procedure. The event 172 invokes program module 118.

Program module 118 requests logistics module 116 to extract sample 120 from the running production and to assign a sample ID to the sample 120. Program module 118 selects one of the method keys of the set 126 in accordance with the test method that is required by regulation or internal rule of control. The program module 118 generates a test order 174 that comprises at least a test order ID, the sample ID of the sample 120, and the selected method key. The test order may include additional data, such as the measurement characteristic of interest, allowed measurement ranges and/or other additional information.

The test order 174 is transmitted from ERP system 102 to server computer 104 via network 163. Receipt of test order 174 by server computer 104 invokes table generation module 132. The table generation module 132 reads the method key from the test order 174 and uses the method key in order to retrieve the method definition assigned to that method key in the database tables 150. The method steps of the retrieved method definition are read from the database tables. The method steps are instantiated using the data contained in the test order, such as the measurement characteristic of interest. On this basis the table generation module 132 generates the table 156 that includes the test order 174 and previously received test orders as well as the respective instantiated method steps to be performed for the execution of these test orders.

When a user logs in e.g. on client computer 158 he or she can view the table 156. In order to reduce the size of the table 156 it can be filtered by means of table filtering module 134 in order to show only a subset of the test orders to the user that are relevant to the user and/or the client computer used for carrying out the current part of the test order. After user authentication by means of authentication module 136 the user can select one of the test orders e.g. by clicking on the respective row or rows of table 156 in order to initiate execution of the test order.

The user utilizes the bar code reader 164 for reading the label 122 for identification of the sample 120. This ensures that the test order is performed with respect to the correct sample as identified in the test order details containing the sample ID. The method steps are communicated from the client computer 158 to the appropriate laboratory instrument 166, 168 or another laboratory instrument using the communication interface as given in the database table 154.

The measurement results obtained from the laboratory instruments are transmitted from client computer 158 to the server computer 104 and stored by storage module 138 in the database 140. After intermediate results have been received from laboratory instruments or have been entered manually, these results are stored in the database 140. This is triggered by the user of client computer 158 digitally signing the set of intermediate results. Calculations are carried out based on the method definitions contained in the test order as soon as all input parameters for a given calculation are present and again if any of these parameter changes later on. Validation of the results requires a secondary digital signature by another user for approval of the intermediate results. This procedure is managed by report module 148. Report module 148 accepts a secondary digital signature only from a user that is not reported to be involved in the execution of the current test order in the audit trail 146.

On the basis of the intermediate results stored in the database 140 a final test report 176 is generated and transmitted from server computer 104 to ERP system 102 where it is persistently stored in the database 128 for later reference and/or for further use in the process which triggered the inspection in the first place.

It is important to note that only the method keys are stored in the ERP system 102 but not the individual method steps. This ensures that only a minimal amount of complexity is added to the ERP system 102 while the rest of the laboratory setup information is centrally stored on server 104. This enables to seamlessly integrate LIMS functionalities into the ERP system while keeping the administrative overhead at minimum. Further, this enables a high degree of flexibility. For example, server computer 104 can be used as a hub that services two or more ERP systems of the same or different companies. This will be explained in greater detail with respect to FIG. 3.

FIG. 2 shows a flow chart that illustrates a preferred mode of operation of the data processing system of FIG. 1.

In step 200 an event is received by the ERP system. In response a test order is generated using one or more method keys (step 202). The test order is transmitted to the server computer in step 204 where the one or more method keys contained in the test order are utilized to retrieve the respective method steps (step 206).

In step 208 a tabular representation of test orders that have been received by the server computer is generated. The tabular representation includes the method steps to be performed for execution of each test order.

In step 210 a user selects one of the test orders from the tabular representation. This initiates an automatic or semi-automatic performance of the respective method steps involving one or more laboratory instruments that are coupled to the client computer of the user (step 212). In step 214 the measurement results that are obtained by the laboratory instruments are transmitted via the respective client computer to the server computer where the intermediate results are stored in the server computer's database (step 214). In step 216 a test report is generated on the basis of the intermediate results. The test report includes at least the actual measurement value or observation entered by laboratory staff that has been obtained for the measurement value of interest as specified in the test order. The test report is transmitted from the server computer to the ERP system (step 218) where it is persistently stored in the ERP system's database for later reference.

FIG. 3 shows an alternative embodiment where the server computer is used as a central hub for a plurality of ERP systems. Elements in the embodiment of FIG. 3 that correspond to elements in the embodiment of FIG. 1 are designated by similar reference numerals.

The ERP systems 302, 302', . . . can belong to the same or different companies. Each of the ERP systems 302, 302', . . . stores the same set 326 of method keys. This provides a common interface between the various ERP system 302, 302', . . . and server computer 304. In other words, the server computer 304 can receive test orders from any one of the ERP systems and process these test orders as the same set of method keys is utilized across the entire data processing system 300.

LIST OF REFERENCE NUMERALS 100 data processing system
102 ERP system
104 server computer
106 manufacturing plant
108 processor
110 HR module
112 CRM module
114 FI module
116 logistics module
118 program module
120 sample
122 label
124 storage
126 set
128 database
130 processor
132 table generation module
134 table filtering module
136 authentication module
138 storage module
140 database
142 storage
144 audit trail module
146 audit trail
148 report module
150 database table
152 database table
154 database table
156 table
158 client computer
160 client computer
162 LAN
163 network
164 bar code reader
166 laboratory instruments
168 laboratory instruments
170 bus
172 event
174 test order
176 test report
300 data processing system
302 ERP system
302' ERP system
304 server computer
326 set
358 client computer
360 client computer
362 LAN
364 bar code reader
363 network
366 laboratory instrument
368 laboratory instrument
370 bus

What is claimed is:

1. A data processing system comprising:
a) at least one Enterprise Resource Planning (ERP) system (102; 302, 302', . . . ) having:
means (124, 126) for storing s set of test method keys,
means (108, 118) for generating a test order (174) for testing a production sample (120), the test order carrying a method key selected from the set of method keys,
b) a server computer (104) having:
means (142, 150) for storing method definitions to be performed for carrying out test methods, each sequence being retrievable using a respective method key,
means (132) for retrieving one of the method definitions using the method key of a received test order and for instantiating a retrieved method definition to provide method steps,
means (132) for generating a tabular representation (156) of the received test orders showing the method steps,
database means (140) for storing intermediate results received from a client computer (158, 160, . . . ) obtained by performance of one or more of the method steps,
processing means for performing calculations in accordance with one or more of the method steps using the intermediate results,
means (148) for generating a test report (176) for the ERP system, c) the client computer (158, 160, . . . ) having:
   user interface means for viewing the tabular representation (156) and for selecting one of the test orders,
   laboratory instrumentation interface means for communicating with a laboratory instrument (166, 168, . . . ), the laboratory instrument being adapted to perform at least one of the method steps on the production sample; and
wherein the ERP system further comprises a logistics component (116) for controlling the distribution of a plurality of the production sample to client computer locations.

2. The data processing system of claim 1, wherein the logistics component is adapted to assign an identifier (122) to the production sample, and the client computer has means (164) for reading the production sample identifier.

3. A data processing system comprising:
a) at least one Enterprise Resource Planning (ERP) system (102; 302, 302', . . . ) having:
   means (124, 126) for storing a set of test method keys,
   means (108, 118) for generating a test order (174) for testing a production sample (120), the test order carrying a method key selected from the set of method keys,
b) a server computer (104) having:
   means (142, 150) for storing method definitions to be performed for carrying out test methods, each sequence being retrievable using a respective method key,
   means (132) for retrieving one of the method definitions using the method key of a received test order and for instantiating a retrieved method definition to provide method steps,
   means (132) for generating a tabular representation (156) of the received test orders showing the method steps,
   database means (140) for storing intermediate results received from a client computer (158, 160, . . . ) obtained by performance of one or more of the method steps,
   processing means for performing calculations in accordance with one or more of the method steps using the intermediate results,
   means (148) for generating a test report (176) for the ERP system,
c) the client computer (158, 160, . . . ) having:
   user interface means for viewing the tabular representation (156) and for selecting one of the teat orders,
   laboratory instrumentation interface means for communicating with a laboratory instrument (166, 168, . . . ), the laboratory instrument being adapted to perform at least one of the method steps on the production sample; and
wherein the server computer further comprises a filter component (134) for filtering the tabular representation.

4. A data processing system comprising:
a) at least one Enterprise Resource Planning (ERP) system (102; 302, 302', . . . ) having:
   means (124, 126) for storing a set of test method keys,
   means (108, 118) for generating a test order (174) for testing a production sample (120), the test order carrying a method key selected from the set of method keys,
b) a server computer (104) having:
   means (142, 150) for storing method definitions to be performed for carrying out test methods, each sequence being retrievable using a respective method key,
   means (132) for retrieving one of the method definitions using the method key of a received test order and for instantiating a retrieved method definition to provide method steps,
   means (132) for generating a tabular representation (156) of the received test orders showing the method steps,
   database means (140) for storing intermediate results received from a client computer (158, 160, . . . ) obtained by performance of one or more of the method steps,
   processing means for performing calculations in accordance with one or more of the method steps using the intermediate results,
   means (148) for generating a test report (176) for the ERP system,
c) the client computer (158, 160, . . . ) having:
   user interface means for viewing the tabular representation (156) and for selecting one of the test orders,
   laboratory instrumentation interface means for communicating with a laboratory instrument (166, 168, . . . ), the laboratory instrument being adapted to perform at least one of the method steps on the production sample; and
wherein the server computer farther comprises an authentication component (136) for authenticating a user of the client computer.

5. A data processing system comprising:
a) at least one Enterprise Resource Planning (ERP) system (102; 302, 302', . . . ) having:
   means (124, 126) for storing a set of test method keys,
   means (108, 118) for generating a test order (174) for testing a production sample (120), the test order carrying a method key selected from the set of method keys,
b) a server computer (104) having:
   means (142, 150) for storing method definitions to be performed for carrying out test methods, each sequence being retrievable using a respective method key,
   means (132) for retrieving one of the method definitions using the method key of a received test order and for instantiating a retrieved method definition to provide method steps,
   means (132) for generating a tabular representation (156) of the received test orders showing the method steps,
   database means (140) for storing intermediate results received from a client computer (158, 160, . . . ) obtained by performance of one or more of the method steps,
   processing means for performing calculations in accordance with one or more of the method steps using the intermediate results,
   means (148) for generating a test report (176) for the ERP system,
c) the client computer (158, 160, . . . ) having:
   user interface means for viewing the tabular representation (156) and for selecting one of the test orders,
   laboratory instrumentation interface means for communicating with a laboratory instrument (**166,

168, . . . ), the laboratory instrument being adapted to perform at least one of the method steps on the production sample; and the server computer further comprises means (144) for generating an audit trail and an approval component (148), wherein the approval component excludes users that are reported in the audit trail from providing an approval to a result obtained from the testing of the production sample.

6. A method for data processing comprising the following steps:

generating a test order (174) by an Enterprise Resource Planning (ERP) system (102; 302, 302', . . . ) for testing a production sample (122), the test order carrying a method key selected from a predefined set (126) of method keys, transmitting the test order to a server computer (104), using the method key of the test order for retrieval of a method definition, instantiating the method definition using the test order to provide method steps, generating a tabular representation (156) of the received test order and the method steps for selection from a client computer (158, 160, . . . ) that is coupled to the server computer in order to perform the method steps using laboratory instruments (166, 168, . . . ) being coupled to the client computer, and further comprising controlling the distribution of a plurality of the production sample to client computer locations using a logistics component (116) of the ERP system.

7. The method of claim 6, further comprising filtering the tabular representation by means of a filter parameter.

8. A method for data processing comprising the following steps:

generating a test order (174) by an Enterprise Resource Planning (ERP) system (102; 302, 302', . . . ) for testing a production sample (122), the test order carrying a method key selected from a predefined set (126) of method keys, transmitting the test order to a server computer (104), using the method key of the test order for retrieval of a method definition, instantiating the method definition using the test order to provide method steps, generating a tabular representation (156) of the received test order and the method steps for selection from a client computer (158, 160 , . . . ) that is coupled to the server computer in order to perform the method steps using laboratory instruments (166, 168, . . . ) being coupled to the client computer, and further comprising filtering the tabular representation by means of a filter parameter, which provides showing to a user only a test order associated with the user.

9. A system for processing data for managing test orders for testing of product comprising:

means for generating a test order (174) by an Enterprise Resource Planning (ERP) system (102; 302, 302', . . . ) for testing a production sample (122), the test order carrying a method key selected from a predefined set (126) of method keys, means for transmitting the test order to a server computer (104), means for using the method key of the test order for retrieval of a method definition, means for instantiating the method definition using the test order, means for generating a tabular representation (156) of the received test order and the instantiated method definition for selection from a client computer (158, 160, . . . ) that is coupled to the server computer in order to perform the method steps using laboratory instruments (166, 168, . . . ) being coupled to the client computer, and further comprising means for controlling the distribution of a plurality of the production sample to client computer locations using a logistics component (116) of the ERP system.

10. A system for processing data for managing test orders for testing of product comprising:

means for generating a teat order (174) by an Enterprise Resource Planning (ERP) system (102; 302, 302', . . . ) for testing the production sample (122) the test order carrying a method key selected from a predefined set (126) of method keys, means for transmitting the test order to a server computer (104), means for using the method key of the test order for retrieval of a method definition, means for instantiating the method definition using the teal order, means for generating a tabular representation (136) of the received test order and the instantiated method definition for selection from a client computer (158, 160, . . . ) that is coupled to the server computer in order to perform the method steps using laboratory instruments (166, 168, . . . ) being coupled to the client computer, and further comprising filtering the tabular representation by means of a filter parameter for showing a subset of the test order to a user which is relevant to the user and/or the client computer used for carrying out the test order.

11. A method for data processing comprising the following steps:

generating a test order (174) by an Enterprise Resource Planning (ERP) system (102; 302, 302', . . . ) for testing a production sample (122), the test order carrying a method key selected from a predefined set (126) of method keys, transmitting the test order to a server computer (104), using the method key of the test order for retrieval of a method definition, instantiating the method definition using the test order to provide method steps, generating a tabular representation (156) of the received test order and the method steps for selection from a client computer (158, 160, . . . ) that is coupled to the server computer in order to perform the method steps using laboratory instruments (166, 168', . . . ), being coupled to the client computer, and further comprising filtering the tabular representation by means of a filter parameter, which provides a subset of the test order to a user that are relevant to the user and/or the client computer used for carrying out part of the test order.

* * * * *